J. B. CHOLLAR.

Cooking Stove.

No. 732.

Reissued May 31, 1859.

Witnesses:

A. H. Perkinpine.

Chas. E. Foste.

Inventor:

David Stuart

Richard Peterson.

N. PETERS, Photo-Lithographer, Washington, D. C.

UNITED STATES PATENT OFFICE.

DAVID STUART AND RICHARD PETERSON, OF PHILADELPHIA, PENNSYLVANIA, ASSIGNEES OF J. B. CHOLLAR.

IMPROVEMENT IN PLATES FOR BOILER-HOLES AND TOPS OF STOVES.

Specification forming part of Letters Patent No. 6,087, dated February 6, 1849; Reissue No. 732, dated May 31, 1859.

*To all whom it may concern:*

Be it known that we, DAVID STUART and RICHARD PETERSON, of the city and county of Philadelphia, and State of Pennsylvania, have, by mesne assignments, become the owners of all the right, title, and interest in an Improvement in Plates for Boiler-Holes and Tops of Stoves, for which Letters Patent of the United States were granted to JOHN B. CHOLLAR on the 6th day of February, 1849; that they now believe the said patent to be inoperative and invalid by reason of a defective specification, and that the following is a full, clear, and exact description of the invention, reference being had to the accompanying drawings, and to the letters of reference marked thereon.

The invention of the said JOHN B. CHOLLAR relates to an improvement in center or cross pieces for cooking stoves and ranges, whereby their durability and strength are increased; and the improvement consists in making the said center or cross pieces with a hollow projection or chamber underneath next to the fire, and with openings to allow the air to pass into and circulate within the said chamber, which is thus maintained at such a temperature as not to be injuriously affected by the heat of the fire. The chamber also serves the purpose of stiffening the entire cross-piece, and prevents it from warping and sinking in the middle.

In order to enable others skilled in the manufacture of stoves to make and use the invention, we will now proceed to describe the manner in which it may be carried into effect.

Figure 1:
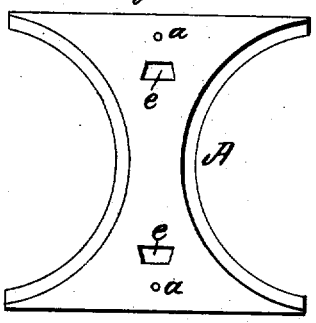
Figure 2:
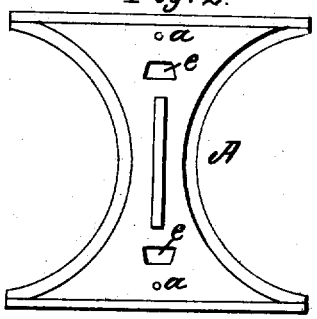
Figure 3:
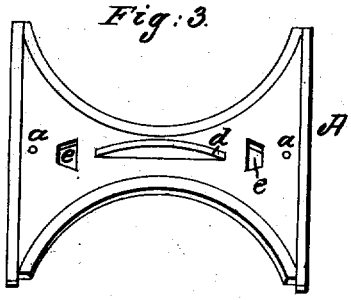
Figure 4:
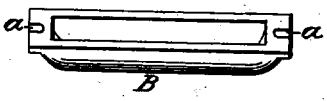
Figure 5:
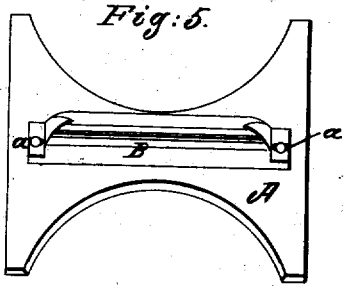

On reference to the accompanying drawings, which form part of this specification, Figure 1 is a top view of J. B. CHOLLAR'S improved cross-piece for cooking stoves and ranges; Fig. 2, a view of the under side of the cross-piece, with part of the same removed; Fig. 3, a perspective view of Fig. 2; Fig. 4, a perspective view of a detached portion of the improved cross-piece; Fig. 5, a perspective view of the cross-piece entire.

Similar letters of reference allude to similar parts throughout the several views.

The improved cross-pieces are, as regards exterior form, similar to those commonly used on the tops of cooking stoves and ranges for supporting the cooking utensils. The usual cross or center pieces, however, are made of simple flat plates of cast-iron, which, owing to the intense and constant heat to which they are subjected, soon sink in the middle and become so warped and bent, and so unfit for the purpose intended as to require repeatedly replacing with new ones. This evil is obviated in CHOLLAR'S improvement by making the cross-pieces with a hollow chamber on the under side, which strengthens the cross-piece and prevents it from warping or sinking in the middle, air being admitted to the chamber, so as to keep it cool.

The views in the accompanying drawings illustrate one mode of making CHOLLAR'S improved cross-pieces.

A represents a cast-iron plate of the required form, and B a hollow tray or shell secured to the under side of the plate by means of rivets passing through holes *a a* in the plate, the shell thus forming a hollow chamber.

A rib, *d*, may be cast on the under side for imparting additional strength, the rib being covered by the hollow shell. In the top of the plate are openings *e*, which pass entirely through the plate and communicate with the interior of the hollow chamber B, thus serving the double purpose of affording a means of lifting the cross-piece and of allowing the air to pass into the hollow projection, so as to circulate therein and maintain the entire cross-piece at such a temperature that it cannot be injured by the heat of the fire.

It will be evident to those familiar with the manufacture of stoves that the hollow chamber underneath the cross-piece may be formed in other ways than that illustrated and described, and that the form of the chamber may be such as to extend over the greater part of the surface of the cross-piece, without altering the main features of the invention.

Irrespective, therefore, of the precise mode herein described and illustrated of making the hollow chamber, and irrespective of the form and extent of the chamber, we claim and desire to secure by Letters Patent, as the invention of the aforesaid JOHN B. CHOLLAR—

Constructing a cross-piece for cooking stoves and ranges with a hollow chamber, and with the openings *e e* to allow air to pass into the said chamber, substantially as set forth.

In testimony whereof we have signed our names to this specification in the presence of two subscribing witnesses.

DAVID STUART.
RICHARD PETERSON.

Witnesses:
A. H. PERKINPINE,
CHAS. E. FOSTER.